United States Patent [19]
Toga et al.

[11] 4,415,727
[45] Nov. 15, 1983

[54] MODIFIED POLYETHYLENE TEREPHTHALATE MOLDING MATERIAL

[75] Inventors: Yuzo Toga; Toshio Shimada; Ichiro Okamoto, all of Himeji, Japan

[73] Assignee: Daicel Chemical Industries, Ltd., Osaka, Japan

[21] Appl. No.: 416,746

[22] Filed: Sep. 10, 1982

[30] Foreign Application Priority Data

Sep. 11, 1981 [JP] Japan ................................ 56-144214

[51] Int. Cl.$^3$ ...................... C08G 63/02; C08G 63/70
[52] U.S. Cl. .................................... 528/272; 264/523; 528/274; 528/279; 528/286; 528/302; 528/308.1; 528/308.6
[58] Field of Search ............... 528/272, 274, 279, 286, 528/302, 308.1, 308.6

[56] References Cited

U.S. PATENT DOCUMENTS 3,592,876 7/1971 Brinkmann et al. ............ 528/298 X

FOREIGN PATENT DOCUMENTS 1268442 3/1972 United Kingdom .

Primary Examiner—Lucille M. Phynes
Attorney, Agent, or Firm—Sughrue, Mion, Zinn, Macpeak and Seas

[57] ABSTRACT

A modified polyethylene terephthalate molding material containing terephthalic acid as a major dicarboxylic acid component and ethylene glycol as a major glycol component, which contains 0.1 to 15 mol %, based on the total amount of said glycol component present, of 2-methyl-1,3-propanediol as part of said glycol component.

9 Claims, No Drawings

MODIFIED POLYETHYLENE TEREPHTHALATE MOLDING MATERIAL

FIELD OF THE INVENTION

This invention relates to a modified polyethylene terephthalate molding material. More particularly, it pertains to a polyethylene terephthalate molding material for molding bottles of polyethylene terephthalate which is difficult to crystallize.

BACKGROUND OF THE INVENTION

It is well known that polyethylene terephthalate is one of the most useful synthetic fibers and is widely used as film in industrial uses and for packaging foods. Recently polyethylene terephthalate has come into rapid use in biaxially stretched bottles for packaging liquid foods and cosmetics. This is attributed to the fact that, as compared with polyvinyl chloride or polyolefin-EVA (ethylene-vinyl alcohol) copolymer, double-layered material conventionally used for bottles, polyethylene terephthalate is excellent in hygienic properties, impact resistance, heat resistance, transparency, gas barrier properties, chemical resistance, weatherability, etc., and has well balanced physical properties for bottles.

However, polyethylene terephthalate is essentially a highly crystalline resin and, therefore, appears opaque. Hence, various techniques have been employed to obtain transparent bottles of polyethylene terephthalate.

In general, polyethylene terephthalate bottles (hereinafter abbreviated "PET bottles") are manufactured by blow molding techniques such as direct blow molding, injection blow molding or biaxially stretching blow molding. In order to manufacture transparent PET bottles, it is important, from the viewpoint of material aspects, to select polyethylene terephthalate having a proper molecular weight according to the blow molding method and the section thickness of the molding to be manufactured and, from the viewpoint of molding aspects, it is necessary to preliminarily dry the PET chips well or to rapidly cool the resin in the molten state as fast as possible. In particular, with thick-walled bottles, it is of importance to minimize crystallization of polyethylene terephthalate in the period between parison molding and blow molding.

As one approach for modifying polyethylene terephthalate to satisfy the above requirements, it is known to use a small quantity of isophthalic acid together with terephthalic acid as the dicarboxylic acid component of PET or to use a small quantity of neopentylglycol or cyclohexanedimethanol together with ethylene glycol as the glycol component of PET, thus producing copolymeric PET having a slow crystallizing rate by copolymerizing the above-described ingredients (for example, see Lecture Abstracts of the 11th Colloquium on Structure and Physical Properties of High Polymers, held by the Japanese High Polymer Society, Kanto Branch, on June 16, 1981, "Recent Progress in Modification of Polymers", p. 3).

With the above situation in mind, the inventors intensively investigated glycols functioning as comonomers which provide a PET crystallization-controlling effect and, as a result, found that 2-methyl-1,3-propanediol is extremely excellent as such a glycol, thus having achieved the present invention.

SUMMARY OF THE INVENTION

The present invention provides a polyethylene terephthalate which is excellent as a material for molding thick-walled PET bottles, which contains terephthalic acid as a major dicarboxylic acid component and ethylene glycol as a major glycol component, and contains 0.1 to 15 mol %, based on the glycol component, of 2-methyl-1,3-propanediol as part of the glycol component.

DETAILED DESCRIPTION OF THE INVENTION

The amount of ethylene glycol used as a major glycol component is 70 mol % or more, preferably 80 mol % or more, based on the total amount of glycol component present. The amount of terephthalic acid used as a major dicarboxylic acid component is 80 mol % or more, preferably 90 mol % or more, based on the total amount of the dicarboxylic acid component present.

In general, polycondensation of an alkylene glycol having a methyl side chain with terephthalic acid or a lower alkyl ester thereof (wherein the lower alkyl moiety contains from 1 to 9 carbon atoms) gives a high molecular weight polyester. It is also known that when the methyl group is present in an asymmetric position of the alkylene glycol, the resulting polymer crystallizes only with difficulty due to irregularity in the polymer structure. As commonly used alkylene glycols having a methyl group in an asymmetric position, there are, for example, 1,2-propylene glycol, 1,3-butylene glycol, etc. However, in these glycols, the carbon atom to which the methyl side chain is bound also has a hydroxy group to form alkylene glycols having a secondary hydroxy group and a primary hydroxy group. Thus, the two hydroxy groups show different reactivity with carboxyl groups of a dicarboxylic acid. Particularly, the reactivity of the secondary hydroxy group is much less than that of the primary hydroxy group and, as a whole, the reaction rate of such a glycol is much slower than that of a glycol where the two hydroxy groups are both primary hydroxy groups.

2-Methyl-1,3-propanediol used in the present invention has one methyl group as a side chain and has an asymmetric chemical structure. The use of this compound as a component of a polyester polymer makes the structure of resulting polyester polymer irregular, which extremely reduces crystallinity and the crystallizing rate. In addition, since the two hydroxy groups are primary hydroxy groups, they show high reactivity and easily react with carboxyl groups to form ester bonds.

The amount of 2-methyl-1,3-propanediol to be mixed with ethylene glycol ranges from 0.1 to 15 mol %, preferably 2 to 10 mol %, based on the total amount of glycol component present. The 2-methyl-1,3-propanediol reacts with an equal mol of the dicarboxylic acid and, thus, the amount of 2-methyl-1,3-propanediol as described above is the same in the final polyester (i.e., polyethylene terephthalate). If the amount is less than 0.1 mol %, the above-described effects attributable to 2-methyl-1,3-propanediol are difficult to obtain, whereas if more than 15 mol % is used, the melting point and crystallinity of the resulting polymer is decreased so much that the polyester becomes inferior as a bottlemolding material from the viewpoint of heat resistance and mechanical strength.

The modified polyethylene terephthalate of the present invention can be produced according to known processes for producing copolymerized polyesters as described in, for example, U.S. Pat. Nos. 2,465,319 and 2,071,250, i.e., directly reacting a dicarboxylic acid with a glycol or utilizing an interesterification reaction between a dicarboxylic acid lower alkyl ester and a glycol. The latter process is more specifically described below.

One mol of dimethyl terephthalate and a molar excess, i.e., 1.1 to 2.0 mols (total) of a mixture of ethylene glycol and 2-methyl-1,3-propanediol at the earlier recited proportions are subjected to interesterification reaction in a nitrogen stream at ordinary pressure at temperature of about 150° to about 240° C. using a conventional esterification catalyst, methanol produced is distilled off and, if desired or necessary, a catalyst, a coloration-preventing agent (for example, tridecyl phosphite, etc.), etc., is/are added thereto, followed by conducting polycondensation at about 250° to 300° C. under a reduced pressure up to 5 mm Hg. The thus obtained polymer may be subjected to solid phase polymerization at a temperature 20° to 50° C. lower than its melting point in vacuo or in a nitrogen stream in order to further increase the molecular weight of the polymer.

As the above esterification catalyst, a wide variety of catalysts can be used. For example, there can be illustrated titanium compounds such as tetramethoxytitanium, tetraethoxytitanium, tetra-n-propoxytitanium, tetra-iso-propoxytitanium, tetrabutoxytitanium, etc., tin compounds such as di-n-butyltin dilaurate, di-n-butyltin oxide, dibutyltin diacetate, etc., and a combination of an acetate of magnesium, calcium, zinc or the like and antimony oxide or the above titanium compounds. These catalysts are preferably used in an amount of 0.002 to 0.8 wt % based on the copolymer to be produced. In addition to the coloration-preventing agent, other conventional additives such as a polymerization accelerator, brightening agent, light-resistant agent, etc., may be added according to the end use of the polyester.

The modified polyethylene terephthalate obtained by the process of the present invention is manufactured using terephthalic acid (or a lower alkyl ester thereof wherein the lower alkyl moiety contains from 1 to 9 carbon atoms), ethylene glycol and 2-methyl-1,3-propanediol as starting materials. As additional copolymerizable components, there may be used polybasic aliphatic carboxylic acids containing from 3 to 30 carbon atoms, such as adipic acid, azelaic acid, sebacic acid, etc., polybasic aromatic carboxylic acids containing from 8 to 30 carbon atoms, such as isophthalic acid, trimellitic acid, pyromellitic acid, 2,6-naphthalenedicarboxylic acid, etc., and polyhydric alcohols containing from 3 to 30 carbon atoms, such as propylene glycol, neopentyl glycol, 1,6-hexamethylene glycol, 1,4-cyclohexanediol, cyclohexanedimethanol, trimethylolpropane, pentaerythritol, etc., in suitable amounts according to the end use of the polyester.

The polyethylene terephthalate obtained by the present invention has an intrinsic viscosity of 0.4 or more, preferably 0.4 to 1.2. The modified polyethylene terephthalate obtained by the present invention is suited as a material for molding bottles, particularly thick-walled bottles. Transparent bottles having good appearance can be obtained from the material by any conventional direct blow molding, injection blow molding and biaxially stretching blow molding method.

The present invention will now be described in more detail by the following examples of preferred embodiments of the present invention which, however, are not to be construed as limiting the present invention in any way.

Additionally, "parts" in the following examples are parts by weight, and data given in Table 1 are obtained by the following measuring methods.

(1) 2-Methyl-1,3-propanediol group content:

Indicated in terms of mol %, based on the total glycol groups present, of 2-methyl-1,3-propanediol group determined by the NMR analysis (nuclear magnetic resonance) spectrum of the resulting resin.

(2) Intrinsic viscosity:

Measured at 25° C. in o-chlorophenol.

(3) m.p. and heat of fusion:

Measured by means of a differential scanning calorimeter, model DSC-1B, made by the Perkin Elmer Co.

EXAMPLE 1

155.4 Parts of dimethyl terephthalate, 73.0 parts of ethylene glycol, 2.2 parts of 2-methyl-1,3-propanediol, and 0.10 part of a catalyst (tetrabutoxytitanium) were charged in a reactor equipped with a double helical ribbon type agitating element, and the mixture was heated at 180° C. for one hour under ordinary pressure in a nitrogen stream, then at 230° C. for 3 hours to distill off methanol in an amount of 89% of the theoretical amount. 0.10 Part of tetrabutoxytitanium and 0.25 part of tridecyl phosphite were further added thereto, and the temperature of the mixture was raised to 270° C. The pressure within the reaction system was reduced to 0.2 mm Hg over 45 minutes, and the system was kept for 4 hours under this condition to react.

EXAMPLES 2, 3 AND 4 AND COMPARATIVE EXAMPLES 1 AND 2

Polymerization was conducted under the same conditions as in Example 1 except for charging the compounds in the amounts given in Table 1. The physical properties of each of the resulting polymers are tabulated in Table 1.

TABLE 1

|  | Example 1 | Example 2 | Example 3 | Example 4 | Comparative Example 1 | Comparative Example 2 |
|---|---|---|---|---|---|---|
| Charged Amounts | | | | | | |
| Dimethyl terephthalate (parts) | 155.4 | 155.4 | 155.4 | 155.4 | 155.4 | 155.4 |
| Ethylene glycol (parts) | 73.0 | 71.9 | 71.1 | 67.0 | 74.5 | 59.6 |
| 2-Methyl-1,3-propanediol (parts) | 2.2 | 3.8 | 4.9 | 10.8 | 0 | 21.6 |
| Tridecyl phosphite (part) | 0.25 | 0.25 | 0.25 | 0.25 | 0.25 | 0.25 |
| Tetrabutoxytitanium (part) | 0.20 | 0.20 | 0.20 | 0.20 | 0.20 | 0.20 |
| Content of 2-methyl-1,3-propanediol group (mol %) | 1.9 | 3.5 | 4.6 | 9.8 | 0 | 21.4 |
| Intrinsic viscosity (dl/g) | 0.49 | 0.52 | 0.48 | 0.51 | 0.51 | 0.52 |
| m.p. (°C.) | 248 | 244 | 238 | 221 | 251 | —* |

TABLE 1-continued

| | Example 1 | Example 2 | Example 3 | Example 4 | Comparative Example 1 | Comparative Example 2 |
|---|---|---|---|---|---|---|
| Heat of fusion (cal/g) | 10.3 | 9.5 | 8.9 | 6.6 | 10.9 | —* |

*No peaks for fusion were observed on the differential scanning calorimeter.

REFERENCE EXAMPLE 1

Each of the polymers obtained in Comparative Example 1 and Example 3 shown in Table 1 was dried in vacuo at 170° C. for 4 hours, and molded into a 25 g weight cylindrical, bottomed parison (internal volume: 25 ml) using an injection molding machine maintained at 275° C. in cylinder temperature. Each of these parisons was left for 5 minutes at an ambient temperature of 110° C., and biaxially stretched to obtain a bottle of 350 ml in internal volume (wall thickness: about 1 mm). A bottle obtained from the polymer of Example 1 was superior to a bottle obtained from the polymer of Comparative Example 1 in transparency.

While the invention has been described in detail and with reference to specific embodiments thereof, it will be apparent to one skilled in the art that various changes and modifications can be made therein without departing from the spirit and scope thereof.

What is claimed is:

1. A modified polyethylene terephthalate molding material containing terephthalic acid as a major dicarboxylic acid component and ethylene glycol as a major glycol component, which contains 0.1 to 15 mol %, based on the total amount of said glycol component present, of 2-methyl-1,3-propanediol as part of said glycol component.

2. The modified polyethylene terephthalate molding material according to claim 1, wherein an amount of the terephthalic acid is 80 mol % or more based on the total amount of the dicarboxylic acid component present.

3. The modified polyethylene terephthalate molding material according to claim 1, wherein an amount of the ethylene glycol is 70 mol % or more based on the total amount of the glycol component present.

4. The modified polyethylene terephthalate molding material according to claim 1, wherein an intrinsic viscosity of the polyethylene terephthalate is 0.4 or more.

5. The modified polyethylene terephthalate molding material according to claim 1, further containing a polybasic aliphatic carboxylic acid having from 3 to 30 carbon atoms and/or a polybasic aromatic carboxylic acid having from 8 to 30 carbon atoms.

6. The modified polyethylene terephthalate molding material according to claim 1, further containing a polyhydric alcohol having from 3 to 30 carbon atoms.

7. A polyethylene terephthalate bottle manufactured by blow molding a modified polyethylene terephthalate containing terephthalic acid as a major dicarboxylic acid component, ethylene glycol as a major glycol component, and 0.1 to 15 mol %, based on the total amount of said glycol component present, of 2-methyl-1,3-propanediol as a part of said glycol component.

8. The modified polyethylene terephthalate molding material according to claim 1, wherein the amount of 2-methyl-1,3-propanediol is 2 to 10 mol %.

9. The bottle according to claim 7, wherein the amount of 2-methyl-1,3-propanedial is 2 to 10 mol %.

* * * * *